United States Patent [19]
Fickel

[11] Patent Number: 5,584,575
[45] Date of Patent: Dec. 17, 1996

[54] LIGHTING FIXTURE WITH STREAMLINE BALLAST AND METHOD OF INSTALLATION

[75] Inventor: Malcolm Fickel, Tustin, Calif.

[73] Assignee: Scientific NRG. Inc., Tustin, Calif.

[21] Appl. No.: 384,315

[22] Filed: Jan. 30, 1995

[51] Int. Cl.[6] ............................. F21S 1/02; F21V 21/04; H01R 33/00
[52] U.S. Cl. ......................... 362/364; 362/365; 362/147; 362/260; 362/265; 362/226
[58] Field of Search ..................................... 362/226, 364, 362/365, 147, 260, 265, 263, 221

[56] References Cited

U.S. PATENT DOCUMENTS

| | | | |
|---|---|---|---|
| 4,564,890 | 1/1986 | Poyer | 362/260 X |
| 4,922,393 | 5/1990 | McNair | 362/364 X |
| 5,077,645 | 12/1991 | Habinak | 362/265 X |
| 5,351,174 | 9/1994 | Ewing | 362/265 X |
| 5,440,471 | 8/1995 | Zadeh | 362/147 X |

FOREIGN PATENT DOCUMENTS

| | | |
|---|---|---|
| 4016531 | 11/1991 | Germany . |
| 2312104 | 2/1990 | Japan . |

Primary Examiner—Carl D. Price
Assistant Examiner—Thomas M. Sember
Attorney, Agent, or Firm—John J. Connors; Connors & Associates

[57] ABSTRACT

A retrofit lighting fixture adapted to fit within a ceiling recess having a conventional electric light socket. The fixture includes a dome shaped reflector open downwardly within which a pair of fluorescent tube lights depend through receptacles in a circular top section. A cylindrical cover fits concentrically over the back of the reflector encompassing the connector ends of the tube lights. A hollow housing containing an electronic ballast for the fluorescent tube lights attaches to the cover. The housing has a cylindrical outer surface and may be formed as a ring, a plurality of cylindrical segments forming a ring, or a complete solid cylinder. A support cord extends from a male base connector through the ballast housing, cover and reflector. The base connector mates with the light socket and a friction member is advanced upward along the cord to the inner surface of the reflector to retain the fixture within the recess.

25 Claims, 7 Drawing Sheets

LIGHTING FIXTURE WITH STREAMLINE BALLAST AND METHOD OF INSTALLATION

BACKGROUND OF THE INVENTION

1. Field of the Invention

This invention relates to a recessed ceiling lighting fixture and, more particularly, to a retrofit fluorescent lighting fixture having a separate housing for an electronic ballast.

2. Background Discussion

Recessed ceiling lighting is a highly desirable means of illumination, both indoors and out. Typically a cylindrical light fixture is inserted into a similarly shaped recess in the ceiling. The fixture connects with a conventional light socket or other type of electrical terminal provided in the ceiling recess for power. The fixture typically includes a trim ring around its lower periphery which covers the unsightly edges of the recess. Often, a canister-like liner is provided in the recess.

One example of such a recessed lighting fixture is disclosed in U.S. Pat. No. 4,641,228, and in several related patents. In these disclosures, a screw base is threaded into a socket within the ceiling recess for power. A flexible strap attached to the screw base extends downward through a central opening in a cover and in a reflector of a fixture. A friction ring is pushed upward along the flexible strap, drawing the reflector up into the recess until a trim-ring surrounding the reflector abuts against the ceiling.

In these patents, the light sources are high-powered, low wattage tubular fluorescent lamps powered by magnetic ballasts which control initiation and maintenance of the glow discharge ionization in the tubular lamps. The ballasts are mounted on dome-shaped reflectors proximate receptacles which receive the terminal end of the fluorescent lamps, with the tubular bodies of the lamps extending into the interior of the reflector. A hollow cover attaches over the reflector to surround the ballasts and lamp connector ends. There are certain drawbacks to the use of magnetic ballasts. First, the total harmonic distortion may be unacceptable. Secondly, the magnets are dense and add substantial relative weight to the overall fixture weight. Third, the initiation timing is delayed and the fluorescent lamps exhibit a flickering before coming fully on. Finally, the power factor for such lights are typically not sufficient to qualify for rebates often given by electric utility companies.

Additionally, in the light fixtures such as described in U.S. Pat. No. 4,641,228 and its related patents, servicing the fixture when a magnetic ballast fails is time-consuming. To service such a failure, the entire reflector must be removed and the individual ballast detached to be replaced by a new one.

There is currently a need for a more efficient, lighter and simpler to maintain fluorescent lighting fixture.

SUMMARY OF THE INVENTION

The lighting fixture of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include low cost of manufacture and installation, the use of electronic ballast, and a compact structure containing the electronic ballast.

The first feature of the fluorescent lighting fixture of this invention is the employment of a substantially dome shaped reflector. This reflector has a light transmitting base section that tapers inward towards a central axis of the reflector to form a top section with a predetermined diameter. The top section has a substantially circular cross-sectional configuration. There is at least one receptacle in the top section for holding a fluorescent lamp, with an end of the lamp received in the receptacle and a body portion of the lamp extending into the reflector.

The second feature is a cover having a substantially cylindrical configuration with a central axis and diameter substantially equal to the diameter of the top section of the reflector. The cover is seated on the top section to cover the top section of the reflector, including the receptacle, with the central axis of the reflector being coincident with the central axis of the cover.

The third feature is a substantially cylindrically shaped housing containing an electronic ballast for the fluorescent lamp. This housing has a central axis and a diameter substantially equal to the diameter of the cover and is seated on the cover with the central axis of the housing coincident with the central axes of the reflector and the cover. Preferably, the housing is substantially in the shape of a hollow cylinder. This hollow cylinder shaped housing has a central, substantially circular opening having a predetermined diameter.

In one embodiment of this invention, the cover has a raised, substantially cylindrical central section with a diameter slightly less than the diameter of said circular opening. The cylindrical central section of the cover fits within the circular opening of the housing. In a second embodiment of this invention, the housing comprises a plurality of separate segments that abut each to form the configuration of a substantially hollow cylinder. For example, there may be two half segments abutting to form the configuration of a substantially hollow cylinder, or there may be four quarter segments abutting to form the configuration of a substantially hollow cylinder. In a third embodiment, the housing is substantially in the shape of a solid cylinder, but hallow inside to retain the electronic ballast. In this third embodiment, the cover has a top providing a substantially level surface that is free of any raised portions that would interfere with the solid cylindrical shaped housing sitting flush against the top. Alternatively, the cover may have a thin wall along its perimeter substantially equal to the height of the solid cylindrical shaped housing to provide a substantially cylindrically shaped recess in which the housing is seated.

The fourth feature is that the fixture fits within a confined recessed space in a ceiling and is connected to a conventional electrical socket in the recessed space. The fixture includes a base connector which is threaded to screw into the electrical socket. This connector is electrically connected to the receptacle for the lamp through the electronic ballast. The dome shaped reflector preferably has its light transmitting base section surrounded by an integral trim ring. This trim ring, when the reflector is mounted in the recessed space, is substantially flush with the ceiling.

The fifth feature is that the fixture includes a strap member extending therefrom which passes through openings in the reflector, cover, and housing, terminating in an end portion having a friction member that is manually forced to move along the strap member towards the reflector, pulling the reflector, cover and housing into the confined recessed space. The reflector, cover and housing upon being assembled within the confined recessed space have a combined height that does not exceed the depth of the confined recessed space. Typically, the confined recessed space has a depth that does not exceed 48 inches, and preferably, this confined recessed space has a depth that ranges between 5 and 48 inches.

This invention also includes a method of replacing a recessed fluorescent ceiling light fixture of the type having a base connector mating with an electric socket provided in a ceiling recess. This method includes the following steps:

(a) disconnecting the base connector from the light socket and removing the existing light fixture;

(b) providing a new fluorescent lighting fixture having a base connector and an electronic ballast enclosed within a housing, said housing attached outside of a cover which covers a light receptacle in a reflector portion of the fixture;

(c) attaching the base connector of said new fluorescent lighting fixture to said electric socket;

(d) raising and attaching the new fluorescent lighting fixture into the recess, said fluorescent lighting fixture having a total height approximately equal to the existing fixture so as to similarly fit within the ceiling recess.

DESCRIPTION OF THE DRAWING

The preferred embodiment of this invention, illustrating all its features, will now be discussed in detail. This embodiment depicts the novel and non-obvious lamp fixture and method of this invention as shown in the accompanying drawing, which is for illustrative purposes only. This drawing includes the following figures (Figs.), with like numerals indicating like parts.

DETAILED DESCRIPTION OF THE PREFERRED EMBODIMENTS

Prior Lamp Apparatus

Figure 1A:
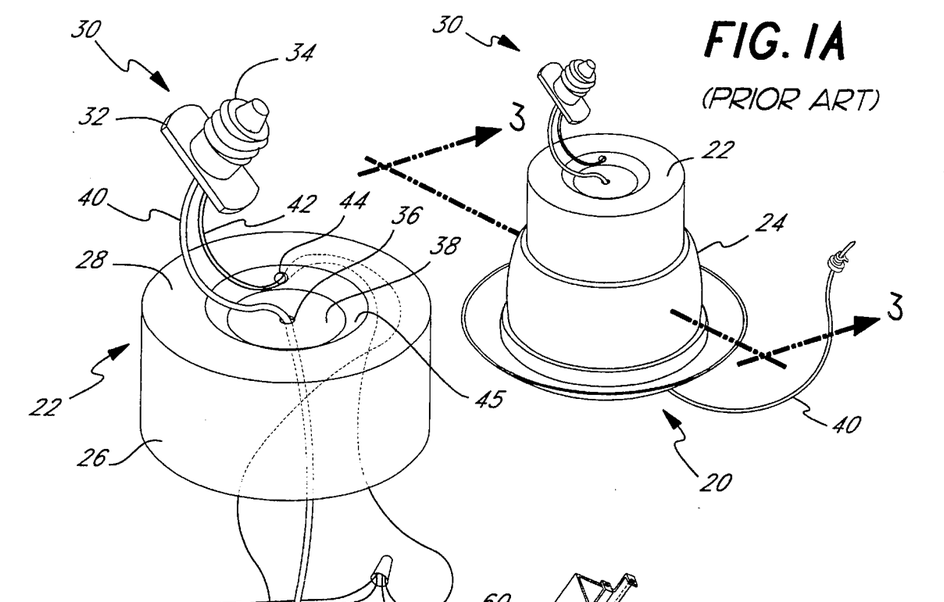
FIG. 1A is a perspective view of a prior art lamp.
Figure 1B:
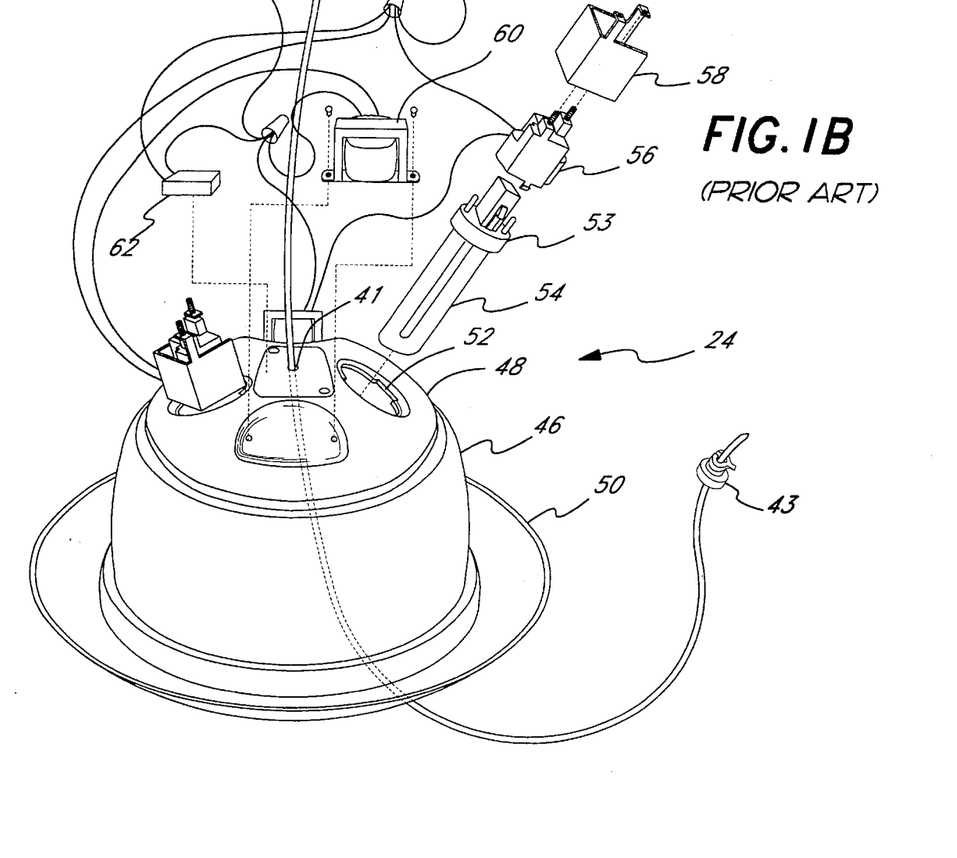
FIG. 1B is an exploded perspective view of the prior art lamp of FIG. 1A.
Figure 2:
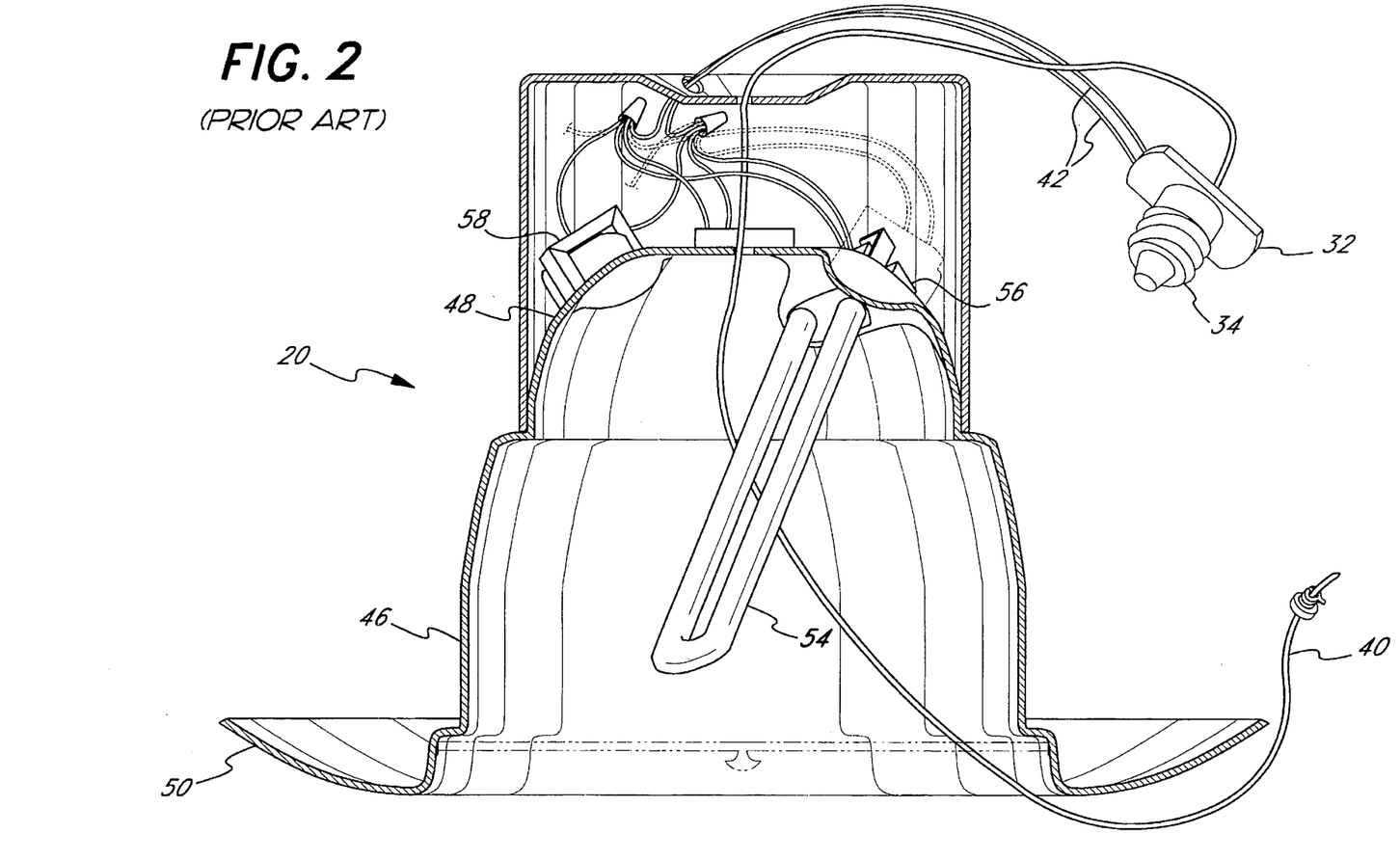
FIG. 2 is cross-sectional view of the prior art lamp taken along line 2—2 of FIG. 1A.

To fully appreciate the inventive aspects inherent in the present invention, a lamp of the prior art should be examined. A lamp fixture 20 of the prior art is illustrated in FIGS. 1A, 1B and 2. The lamp fixture 20 comprises two main components: a cover 22 and a reflector 24. The cover 22 has an inverted cup shape with a cylindrical side wall 26 and a circular top-wall 28. The cover 22 attaches over the substantially dome-shaped reflector 24 for mounting in a similarly shaped ceiling recess, as will be described more fully below.

A base connector 30 provides an input for electricity to the lamp 20. The base connector 30 comprises a plate 32 and a threaded plug 34 sized and shaped to mate with conventional light sockets (not shown) provided in the ceiling recess. The threaded plug 34 has positive and negative terminals separated by insulation, as is well known in the art. A central aperture 36 within a circular recessed area 38 in the top of the cover 22 provides an opening for a flexible suspension strap 40 attached to the base connector 30. The strap 40 extends through the aperture 36 and a through hole 41 in the reflector 24 to pass through the entire lamp apparatus. A friction member 43 is threaded over the free end of the strap 40 to provide a stop for the reflector 24 when the lamp 20 is installed in the recess. Finally, a pair of leads 42 in electrical connection with the terminals of the threaded plug 34 extend through an aperture 44 in a sloped wall 45 of the top of the cover 22.

The reflector 24 is shaped somewhat like a bowler hat with a slightly tapered cylindrical base section 46, a generally spherical top section 48, and a lower upturned trim ring 50. A pair of lamp receptacles 52 formed at diametrically opposed locations in the reflector top section 48 demountably receive a fluorescent lamp comprising a terminal end 53 and a tubular body 54. As seen in FIG. 2, the tubular body 54 extends at an angle into the interior of the reflector 24. A lamp plug 56 protected by an insulating guard 58 couples to each terminal end 53 and is electrically connected via the leads 42 with the base connector 30 and with one of two magnetic ballasts 60. The magnetic ballasts 60 fasten to the exterior of the top section 48 of the reflector at diametrically opposed locations offset 90 degrees from the receptacles 52. To complete the lamp circuit, an ignitor 62 mounted generally centrally on the top section 48 is connected in parallel with the magnetic ballasts 60. The cover 22 encloses and protects all of the electric devices mounted to the back of the reflector 24.

Lamp Fixture of the Present Invention

Figures 3A, 3B:
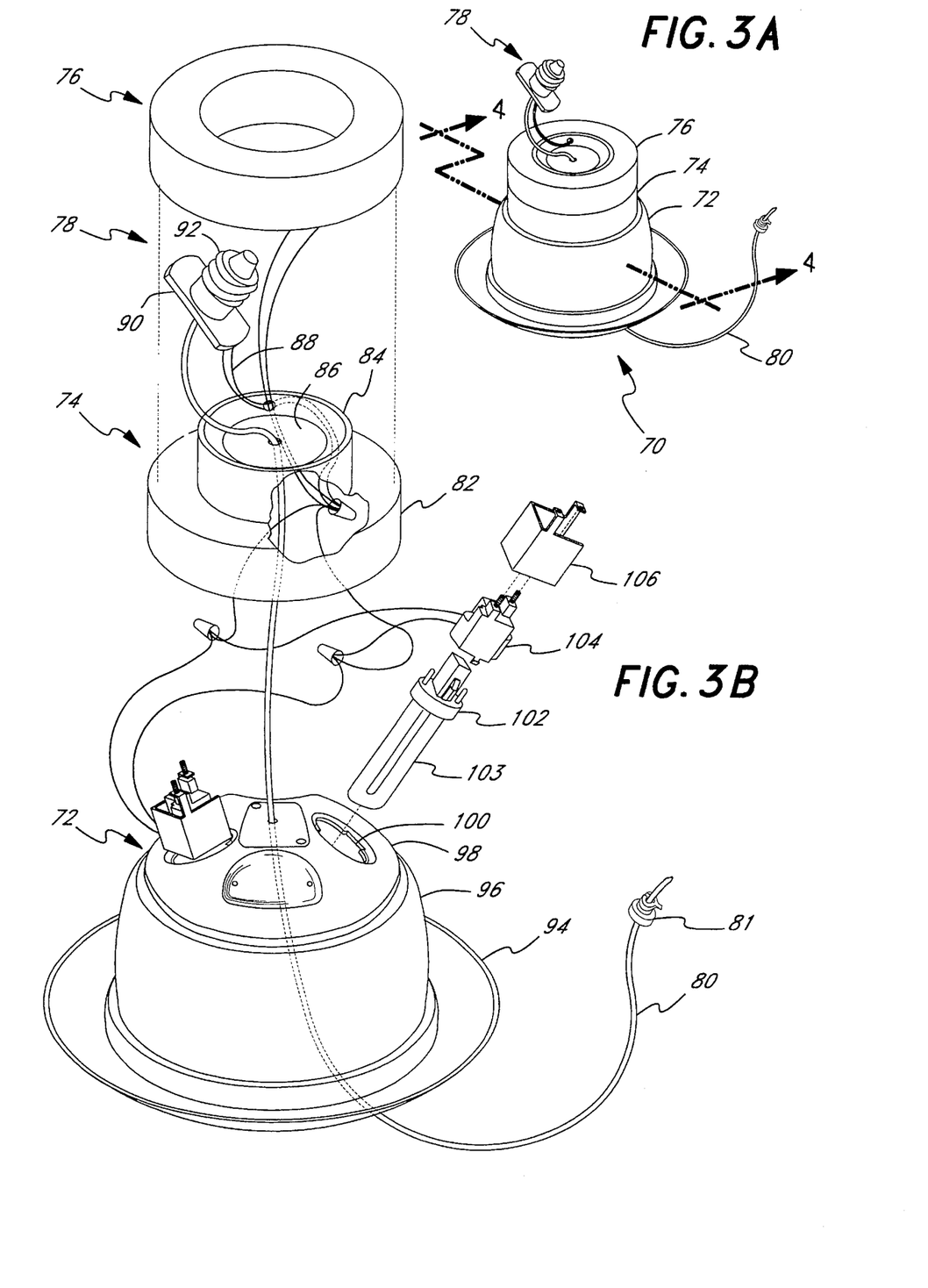
FIG. 3A is a perspective view of one embodiment of the lamp of the present invention.
FIG. 3B is an exploded perspective view of the lamp of FIG. 3A.

An assembled lamp fixture 70 of the present invention is illustrated in FIG. 3A. The fixture 70 is designed to be retrofit in existing ceiling recesses and is thus substantially similar in overall exterior shape to the lamp 20 of the prior art. The improved fixture 70, however, comprises three main components: a reflector 72, a cover 74 and a housing 76. Further, the fixture 70 includes a conventional base connector 78 attached to one end of a flexible suspension strap 80. A friction member 81 is threaded over a free end of the suspension strap 80.

Figure 4:
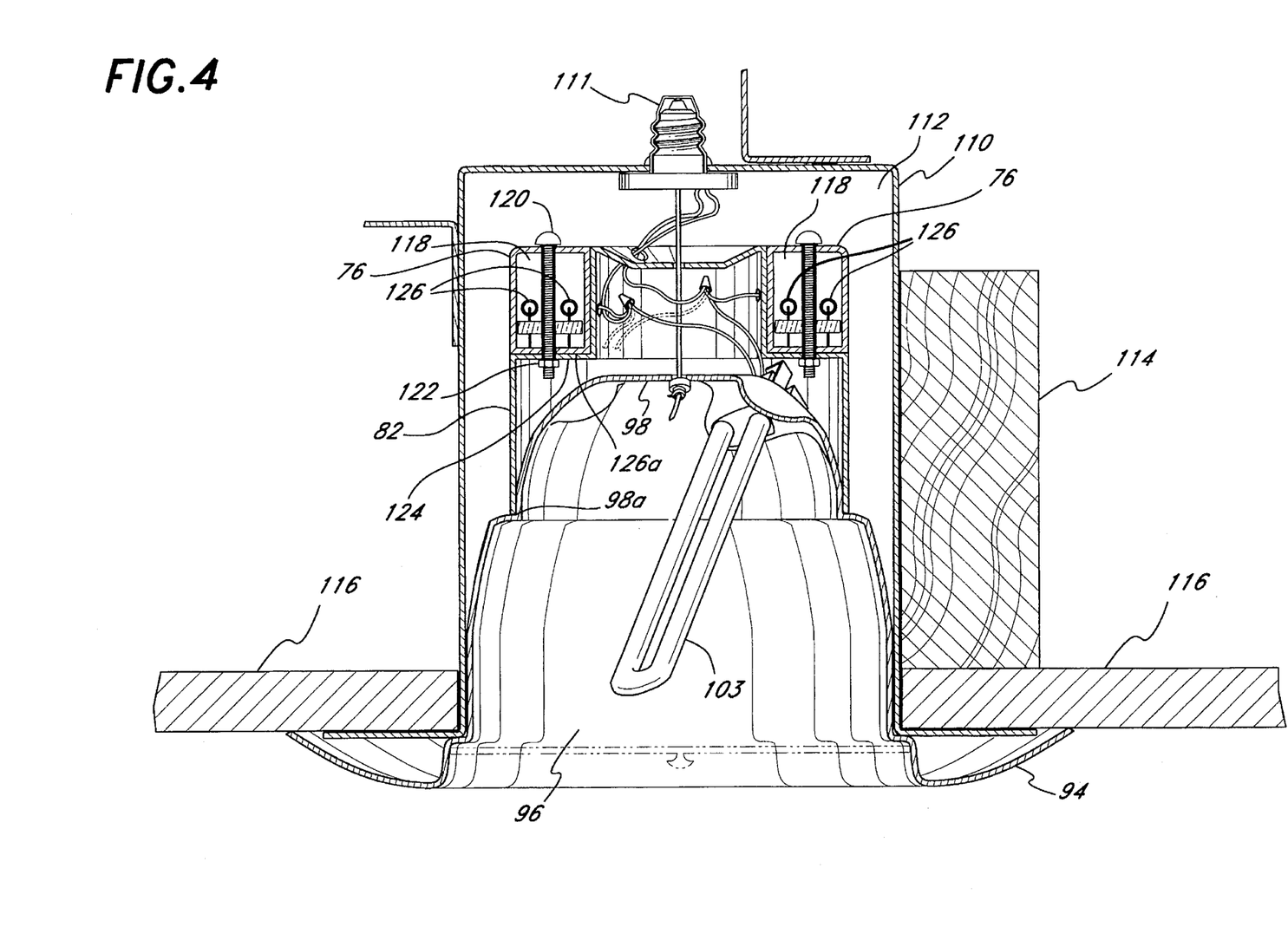
FIG. 4 is cross-sectional view of the lamp of the present invention taken along line 4—4 of FIG. 3A.

As depicted in FIG. 3B and cross-section of FIG. 4, the hollow cover 74 comprises a cylindrical cup portion 82 and a raised cylinder 84 of a smaller diameter than, and extending upward from, the cup portion. A recessed area 86 is formed in the top of the cylinder 84. The suspension strap 80 and electrical leads from the base connector 78 extend though apertures in the recessed area 86 of the cover 74. As with the lamp 20 of the prior art, the base connector 78 includes a plate 90 and a conventional threaded light socket plug 92.

The second main component of the fixture 70, the reflector 72, defines a dome shape substantially identical to the reflector 24 of the prior art. Namely, the reflector 72 comprises a lower trim ring 94, a light-transmitting base section 96 and a generally hemispherical top section 98. The circular trim ring 92 turns upward from the lower edge of the reflector 72. The reflector 72 is slightly inwardly tapered toward its central axis from the trim ring 92 to the top section 98.

The top section 98 includes dual receptacles 100 for mounting terminal ends 102 of fluorescent lamps so that tubular lamp bodies 103 extend at angles into the inner region of the reflector 72. The tubular lamp bodies 103 extend across and downward, crossing at a central point within an upper portion of the reflector 72. The positioning of the lamp bodies 103 and slight taper of the base section 96, coupled with the reflective quality of the base section inner surface, interact to direct the lamp output in a symmetric diverging conical beam. In a preferred embodiment, the lamps are high-output, low-wattage, long-life fluorescent lamps. The lamps derive power through a plug 104 attached to the terminal end 102 and electrically connected via the leads 88 to the base connector 78. Insulating guards 106 are provided over each plug 104.

With reference to FIG. 4, the cup portion 82 of the cover 74 fits concentrically over the top section 98 and rests on a shoulder 98a between the top section and base section 96. Preferably the cover 74 rests on the shoulder 98a, but it could extend all the way to engage the trim ring 94. The cover 74 and reflector 72 may be sized to fit together with a slight interference, the inner diameter of the cup portion 82 being sized slightly smaller than the outer diameter of the top section 98. Alternatively, the cover 74 and reflector 72 may be more securely fastened together with, for example, screws or welds. Desirably, however, the cover 74 and reflector 72 are demountably attached to provide easy access to the plug 104 and terminal lamp end 102 over the top section 98.

FIG. 4 illustrates the fixture 70 as installed into a ceiling recess. A sheet metal container 110 having a threaded female light socket 111 at an upper end defines the recess 112 for the fixture 70. The container typically includes a lower ring-shaped flange for vertically positioning the container with respect to the ceiling panel 116. The container 110 rigidly mounts to one or more ceiling joists 114 in a conventional manner. The fixture 70 inserts into the recess 112 until the trim ring 94 contacts the ceiling panel 116. The outer diameter of the lower portion of the reflector base section 96 is approximately equal to the inner diameter of the recess so that the fixture fits concentrically therein.

Ballast Housing

The third main component of the fixture 70, the housing 76, fits concentrically over the raised cylinder 84 of the cover 74. In this regard, the housing 76 is ring-shaped and is defined by inner an outer cylindrical walls and top and bottom flat circular surfaces disposed at right angles to the central axis of the cylindrical walls. The diameter of the inner cylindrical wall is approximately equal to the diameter of the raised cylinder 84, so that the housing 76 surrounds the raised cylinder and rests on a step surface 124 between the raised cylinder and cup portion 82. The height of the inner an outer cylindrical walls is approximately equal to the height of the raised cylinder 84 above the step 124, so that the cover 74 and housing 76 terminate in a common plane. The housing 76 is preferably demountably fastened to the cover 74 with bolts 120 having nuts 122, or via similar expedients.

Figure 4A:
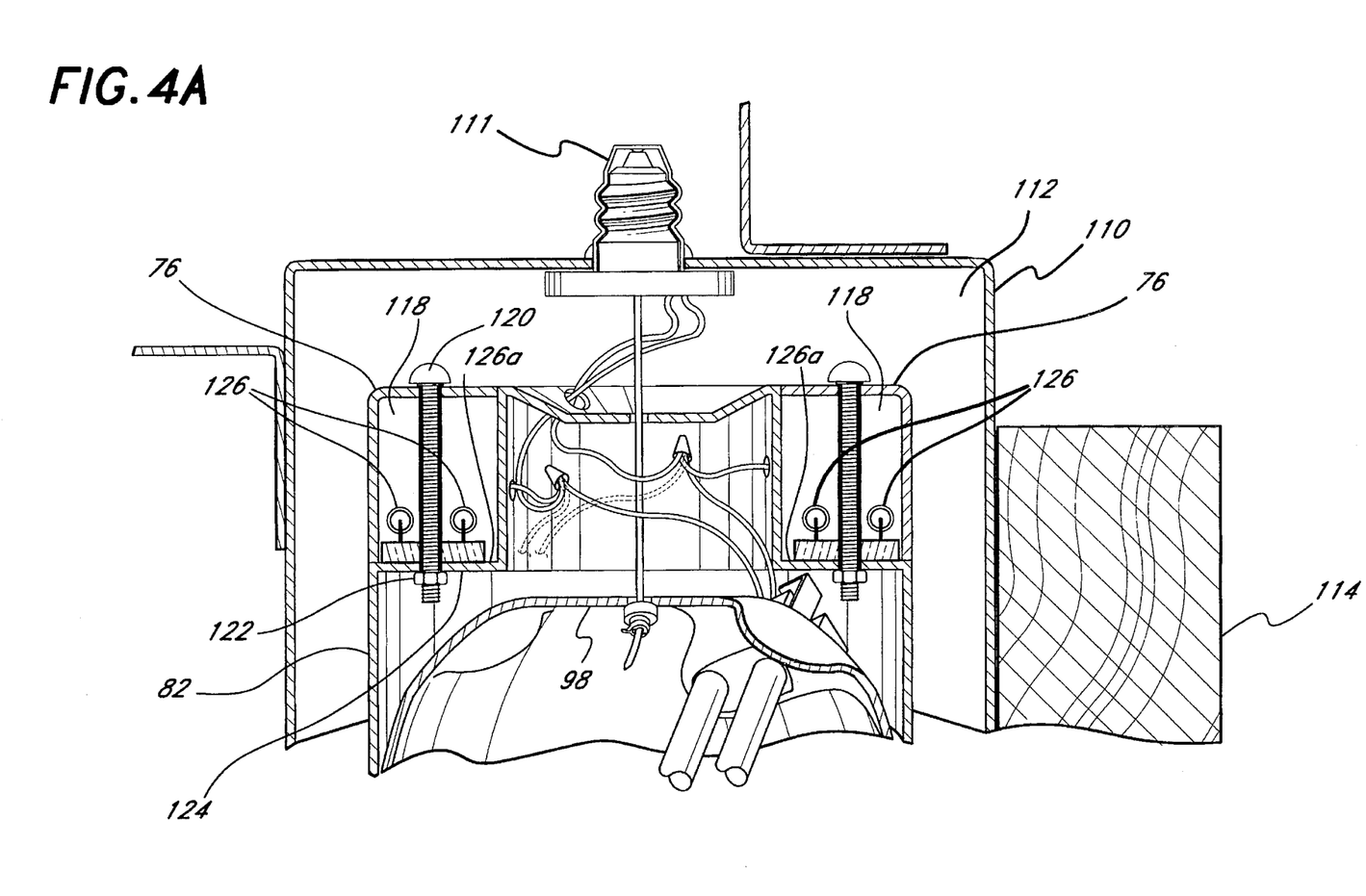
FIG. 4A is cross-sectional view of an alternate embodiment of the lamp of the present invention similar to that shown in FIG. 4.

The housing 76 defines a hollow space 118 within which a plurality of electronic components 126 are mounted on one or more circuit boards. The electronic components 126 comprise the ballast for powering the fluorescent lamps and are in electrical communication with both the base connector 78 and plugs 104. The electronic components 126 are enclosed within the housing 76 so that substitution of a different ballast, or replacement of faulty components, entails removing the housing from the cover 74 and installing a new one. The circuit board 126a, with the ballast components 126 thereon, may be mounted within the housing 76 as shown in FIG. 4, or it may be attached directly to the top of the cover 74 and the housing 76, having an open bottom, fits over it to enclose the ballast as shown ib FIG. 4A. The bolts 120 and nuts 122 are easily accessed and the leads from the components detached from the lamp circuit with the use of wire nuts.

Installation

Again referring to FIG. 4, the installation steps for the fixture 70 are now explained. First, the base connector 78 is pulled as far away from the cover 74 as the leads 88 will allow and threaded into the socket 111 in the recess 112. The flexible suspension strap 80 initially extends out from below the reflector 72. Sliding the friction member 81 upward along the strap 80, the fixture 70 is urged into position within the recess 112 by virtue of the contact between the friction member 81 and lower surface of the reflector top section 98. The final position of FIG. 4 shows the trim ring 94 in contact with the ceiling panel 116 and the top section 98 supported by the friction ring 81. The excess length of strap 80 has been trimmed off.

The overall combined height of the reflector 72, cover 74 and housing 76 is such that a vertical space remains within the recess 112 when the fixture 70 is installed. In one embodiment, the total combined height of the fixture 70 is between 5 and 15 inches, and more preferably is approximately 8–10 inches. The depth of the recess 112 is between 5 and 48 inches, and more preferably is approximately 6–24 inches.

To lower the fixture 70, the friction ring 81 may be provided with a release lever or other such device. Subsequently, to re-install the fixture 70, a new strap 80 must be provided. The strap 80 and friction member 81 may be configured in various ways enabling the friction ring to slide freely up the strap yet restrict relative movement in the opposite direction. Such a combination may be provided by, or example, a toothed cable and friction ring having a pawl biased toward the cable teeth. Other embodiments apparent to those of skill in the art are within the scope of the present invention, the strap/friction ring combination being essentially defined by its load bearing capacity sufficient to reliably suspend the fixture 70.

Alternative Ballast Housing Configurations

Figure 5:
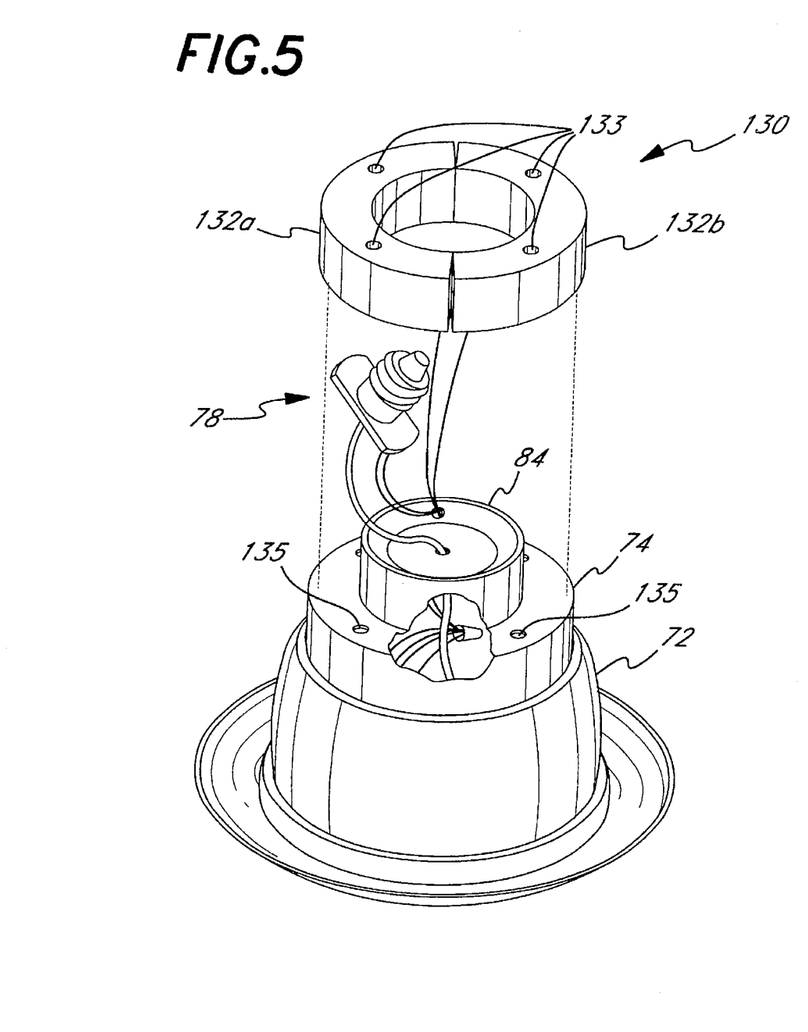
FIG. 5 is an exploded perspective view of an alternative embodiment of the lamp of the present invention.

FIG. 5 illustrates a light fixture incorporating an alternative ballast housing 130. The fixture is identical in most respects to the fixture 70 described above with reference to FIGS. 3 and 4. More specifically, the fixture includes a reflector 72, a cover 74, and a base connector 78. The housing 130 is substantially cylindrical and comprises two half segments 132a and 132b. The segments 132 are hollow as before and contain the electronic ballast (not shown). Each segment 132a and 132b is provided with a pair of bolt holes 133 aligned with bolt holes 135 in the step of the cover 74. The two segments 132a and 132b abut together to define a central cylindrical cavity sized to fit closely over the raised cylinder 84 of the cover 74.

Figure 6:
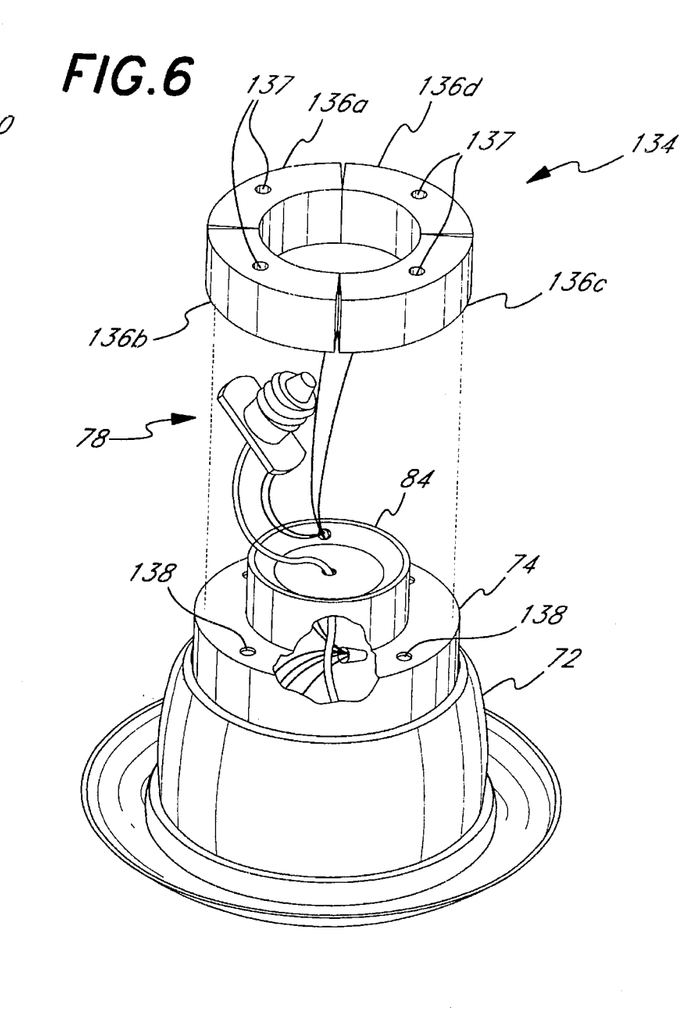
FIG. 6 is an exploded perspective view of an alternative embodiment of the lamp of the present invention.

In FIG. 6, a light fixture incorporating another alternative ballast housing 134 is shown. Once again, the fixture is identical in most respects to the fixture 70, and includes a reflector 72, a cover 74, and a base connector 78. The housing 134 is substantially cylindrical and comprises four quarter segments 136a through 136d. The segments 136 are hollow as before and contain the electronic ballast (not shown). Each segment 136 is provided with a bolt hole 137 aligned with bolt holes 138 in the horizontal step of the cover 74. The four segments 136a through 136d abut together to define a central cylindrical cavity sized to fit closely over the raised cylinder 84 of the cover 74.

Figure 7:
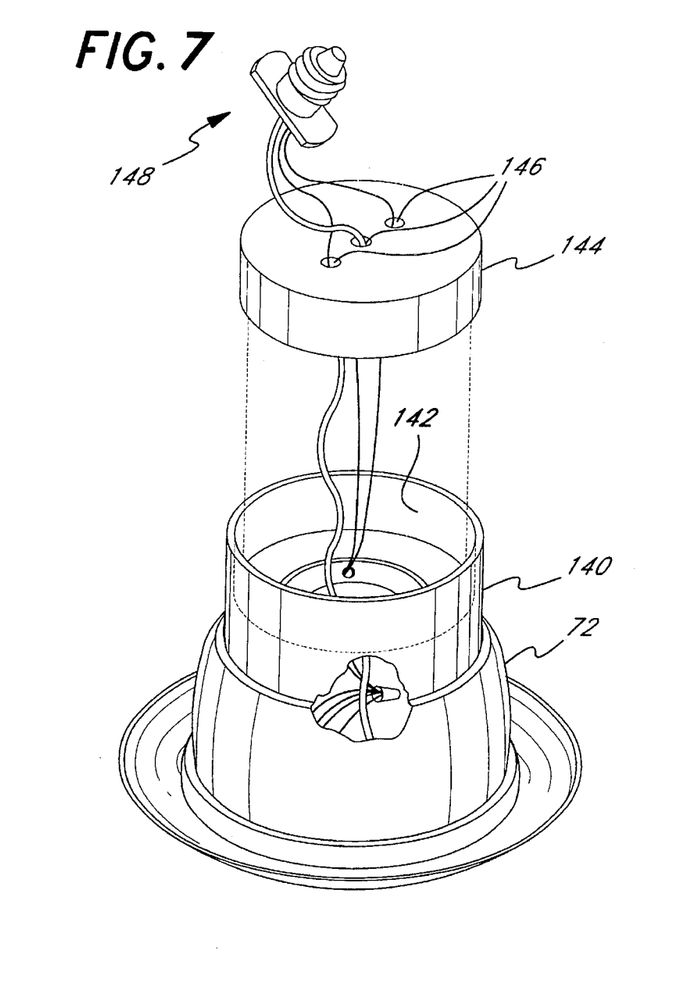
FIG. 7 is an exploded perspective view of an alternative embodiment of the lamp of the present invention.

FIG. 7 depicts a still further alternative lamp fixture having the familiar reflector 72, a modified housing 140 and an alternative housing 144. The cover 140 has a cylindrical outer shape the top portion of which is defined by an upstanding thin perimeter wall 142. The housing 144 has an exterior cylindrical shape sized to fit within the perimeter wall 142 of the cover. Through holes 146 in the housing provide access to the interior of the fixture for the leads and suspension strap attached to a base connector 148. The height of the housing 140 is preferably such that the top surface thereof is coplanar with the top edge of the perimeter wall 142 when the housing is inserted therein. The housing 144 includes an inner cavity for mounting the electronic ballast (not shown).

Figure 8:
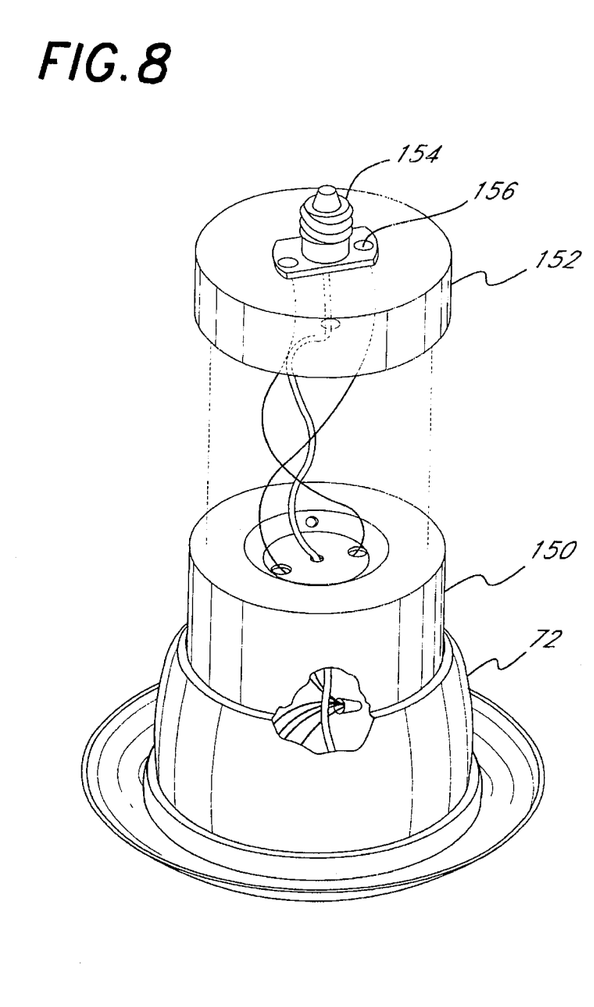
FIG. 8 is an exploded perspective view of an alternative embodiment of the lamp of the present invention.

Finally, FIG. 8 illustrates a still further lighting fixture of the present invention. In this version, the reflector 72 remains the same and the cover 150 has an inverted cup shape. A housing 152, provided as a closed cylinder, lies flat on the top surface of the housing. The cover 150 is free of any protrusions on its top surface which would interfere with the flush contact with the lower surface of the housing 152. A base connector 154 is securely fastened to the top of the housing 152 with rivets 156, for example. In this embodiment, the housing 152 and base connector 154 are together installed by screwing the connector into the female light socket, whereupon the fixture is drawn upward into the recess using the friction ring and suspension strap as before until the cover 150 contacts the housing 152, or the trim ring hits the ceiling panel, but preferably simultaneously.

Benefits Over Prior Designs

Providing the electronic ballast within the detachable housing is both compact and simple to install and replace. Furthermore, the substitution of electronic ballast for magnetic ballast realizes several advantages. First, the overall weight of the lamp fixture is decreased by eliminating the dense magnets. Secondly, the fluorescent lamps are powered in such a way that they come on instantaneously rather than flickering first. Third, the total harmonic distortion of the lamp utilizing an electronic ballast is greatly improved. And finally, the electronic ballast generates a substantially higher power factor which is eligible for utility company rebates.

Although the electronic ballast may tend to heat up, the intimate contact between the housing, cover and reflector facilitates rapid heat dissipation. In fact, the reflector acts as an efficient heat sink given its large surface area.

One of the more important features of the improved lamp fixture is its compact nature. Prior magnetic-ballast lamp fixtures may be replaced with a fixture of the present invention having the same size, enabling the use of the existing ceiling recess. The reflector portions of the lamps are essentially unchanged in size, and the combined height of the cover and electronic housing is approximately equal to the height of the prior magnetic ballast cover. This is so in all of the various embodiments, whether the housing is shaped as a ring surrounding a raised portion of the cover or otherwise. Moreover, other configurations of cover/housing combinations will be appreciated by one of skill in the art.

The fabrication of the fixture is facilitated by the present design as well. More particularly, the reflector is easier to form as the mounting holes for the magnetic ballasts and ignitor are eliminated. The cylindrical housing is relatively simple to form either in one contiguous piece of from segments. Attachment of the electronic components can also be done with a minimum of special tooling allowing the units to be mass produced and easily packaged and shipped. In short, the present lamp fixture configuration simultaneously solves a number of drawbacks plaguing current designs, while remaining inexpensive.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. A fluorescent lighting apparatus, including
   a substantially dome shaped reflector which has a light transmitting base section that tapers inward towards a central axis of the reflector to form a top section with a predetermined diameter, said top section having a substantially circular cross-sectional configuration,
   at least one receptacle in the top section for holding a fluorescent lamp, with an end of the lamp received in the receptacle and a body portion of the lamp extending into the reflector,
   a cover having a substantially cylindrical configuration with a central axis and diameter substantially equal to the diameter of the top section of the reflector, said cover being seated on the top section to cover the top section of the reflector, including the receptacle, with the central axis of the reflector being coincident with the central axis of the cover, and
   a substantially cylindrically shaped housing containing an electronic ballast for the fluorescent lamp, said housing having a central axis and a diameter substantially equal to the diameter of the cover and seated on the cover with the central axis of the housing being coincident with the central axes of the reflector and the cover.

2. The fluorescent lighting fixture of claim 1 where the housing is substantially in the shape of a hollow cylinder.

3. The fluorescent lighting fixture of claim 2 where the hollow cylinder shaped housing has a central, substantially circular opening having a predetermined diameter, and the cover has a raised, substantially cylindrical central section with a diameter slightly less than the diameter of said circular opening, said cylindrical central section of the cover fitting within the circular opening of the housing.

4. The fluorescent lighting fixture of claim 3 where the housing comprises a plurality of separate segments that abut each to form the configuration of a substantially hollow cylinder.

5. The fluorescent lighting fixture of claim 4 where there are two half segments abutting to form the configuration of a substantially hollow cylinder.

6. The fluorescent lighting fixture of claim 4 where there are four quarter segments abutting to form the configuration of a substantially hollow cylinder.

7. The fluorescent lighting fixture of claim 1 where the housing is substantially in the shape of a solid cylinder.

8. The fluorescent lighting fixture of claim 7 where the cover has a top providing a substantially level surface that is free of any raised portions that would interfere with the solid cylindrical shaped housing sitting flush against said top.

9. The fluorescent lighting fixture of claim 8 where the cover has a thin wall along its perimeter substantially equal to the height of the solid cylindrical shaped housing to provide a substantially cylindrically shaped recess in which the housing is seated.

10. The fluorescent lighting fixture of claim 1 including a base connector which is threaded to screw into a conventional electric socket, said connector being electrically connected to the receptacle for the lamp through the electronic ballast.

11. A fluorescent lighting fixture that fits within a confined recessed space in a ceiling and is connected to an electrical socket in said recessed space, said recessed space having a predetermined depth, said fixture including a substantially dome shaped reflector which has a light transmitting base section surrounded by an integral trim ring, said trim ring, when the reflector is mounted in said recessed space, being substantially flush with the ceiling, said reflector tapering inward towards a central axis of the reflector to form a top section with a predetermined diameter, said top section having a substantially circular cross-sectional configuration, a receptacle in the top section for holding a fluorescent lamp, with an end of the lamp received in the receptacle and a body portion of the lamp extending into the reflector, a cover having a substantially cylindrical configuration with a central axis and diameter substantially equal to the diameter of the top section of the reflector, said cover being seated on the top section to cover the top section of the reflector, including the receptacle, with the central axis of the reflector being coincident with the central axis of the cover, a substantially cylindrically shaped housing containing an electronic ballast for the fluorescent lamp, said housing having a central axis and a diameter substantially equal to the diameter of the cover and seated on the cover with the central axis of the housing being coincident with the central axes of the reflector and the cover, and a base connector which is threaded to screw into the electric socket in said confined recessed space, said base connector being electrically connected to the receptacle for the lamp through the electronic ballast, and having a strap member extending therefrom which passes through openings in the reflector, cover, and housing, terminating in an end portion having a friction member that is manually forced to move along the strap member towards the reflector, pulling the reflector, cover and housing into the confined recessed space, said reflector, cover and housing upon being assembled within the confined recessed space having a combined height that does not exceed the depth of the confined recessed space.

12. The fluorescent lighting fixture of claim 11 where the confined recessed space has a depth that does not exceed 48 inches.

13. The fluorescent lighting fixture of claim 12 where the confined recessed space has a depth that ranges between 5 and 48 inches.

14. The fluorescent lighting fixture of claim 11 where the housing is substantially in the shape of a hollow cylinder.

15. The fluorescent lighting fixture of claim 14 where the hollow cylinder shaped housing has a central, substantially circular opening having a predetermined diameter, and the cover has a raised, substantially cylindrical central section with a diameter slightly less than the diameter of said circular opening, said cylindrical central section of the cover fitting within the circular opening of the housing.

16. The fluorescent lighting fixture of claim 15 where the housing comprises a plurality of separate segments that abut each to form the configuration of a substantially hollow cylinder.

17. The fluorescent lighting fixture of claim 11 where the housing is substantially in the shape of a solid cylinder.

18. The fluorescent lighting fixture of claim 17 where the cover has a top providing a substantially level surface that is free of any raised portions that would interfere with the solid cylindrical shaped housing sitting flush against said top.

19. The fluorescent lighting fixture of claim 18 where the cover has a thin wall along its perimeter substantially equal to the height of the solid cylindrical shaped housing to provide a substantially cylindrically shaped recess in which the housing is seated.

20. A fluorescent lighting apparatus, including a substantially dome shaped reflector which has a light transmitting base section that tapers inward towards a central axis of the reflector to form a top section, a receptacle in the top section for holding a fluorescent lamp, a cover having a substantially cylindrical configuration with a central axis, said cover being seated to cover the top section of the reflector, including the receptacle, with the central axis of the reflector being coincident with the central axis of the cover, and a substantially cylindrically shaped housing for enclosing an electronic ballast for the fluorescent lamp, said housing having a central axis and being seated on the cover with the central axis of the housing being coincident with the central axes of the reflector and the cover, said lighting fixture being sized to fit within a confined recessed space in a ceiling and including a base connector adapted to be connected to an electrical socket in said recessed space, said recessed space having a predetermined depth, and said reflector, cover and housing upon being assembled within the confined recess space having a combined height that does not exceed the depth of said recessed space.

21. The fluorescent lighting fixture of claim 20 where the base connector has a strap member extending therefrom which passes through openings in the reflector, cover, and housing, terminating in an end portion having a friction member that is manually forced to move along the strap member towards the reflector, pulling the reflector, cover and housing into the confined recessed space.

22. The fluorescent lighting fixture of claim 20 where the housing is substantially in the shape of a hollow cylinder.

23. The fluorescent lighting fixture of claim 20 where the housing is substantially in the shape of a solid cylinder.

24. A lamp fixture sized to fit within a ceiling recess, the recess being provided with an electric socket, comprising:

a substantially dome-shaped reflector having a receptacle in a top section thereof which extends outside said reflector, a fluorescent lamp including a terminal end adapted to be retained within said receptacle and a tubular body extending within said reflector, a cover attached the top section of said reflector and enclosing said terminal end, said cover having an aperture for passage of electrical leads from said terminal end, a housing detachably mounted outside said cover, said housing defining an inner space within which an electronic ballast is enclosed, said housing including an aperture for electrical leads from said ballast, a base connector adapted to mate with said socket and in electrical communication with said leads from said terminal end and said ballast.

25. A method of replacing a recessed ceiling light fixture having a base connector mating with an electric socket provided in a ceiling recess, comprising the steps of:

disconnecting the base connector from the light socket and removing the existing light fixture;

providing a new fluorescent lighting fixture having a base connector and an electronic ballast enclosed within a housing, said housing attached outside of a cover which covers a light receptacle in a reflector portion of the fixture;

attaching the base connector of said new fluorescent lighting fixture to said electric socket;

raising and attaching the new fluorescent lighting fixture into the recess, said fluorescent lighting fixture having a total height approximately equal to the existing fixture so as to similarly fit within the ceiling recess.

* * * * *